Oct. 12, 1965 H. W. FULLER ETAL 3,212,070
MAGNETIC FILM DATA STORAGE APPARATUS
Filed May 3, 1961 2 Sheets-Sheet 1

INVENTOR.
HARRISON W. FULLER
HARVEY RUBINSTEIN
BY
Philip J. McFarland
ATTORNEYS

MAGNETIC FILM DATA STORAGE APPARATUS

Filed May 3, 1961 2 Sheets-Sheet 2

INVENTOR.
HARRISON W. FULLER
HARVEY RUBINSTEIN
BY
Philip J. McFarland
ATTORNEYS

United States Patent Office 3,212,070
Patented Oct. 12, 1965

3,212,070

MAGNETIC FILM DATA STORAGE APPARATUS

Harrison W. Fuller, Needham Heights, and Harvey Rubinstein, Lynnfield, Mass., assignors to Laboratory For Electronics, Inc., Boston, Mass., a corporation of Delaware Filed May 3, 1961, Ser. No. 107,565
10 Claims. (Cl. 340—174)

The present invention relates in general to new and improved techniques for processing data which result in high density data storage with minimal access and storage time and means for implementing these techniques and in particular to the use of magnetic fields to store data in magnetic media and to retrieve the stored data.

As described in a co-pending application by Harrison W. Fuller, Serial No. 697,058, now U.S. Patent No. 3,140,471, data can be stored in a magnetic medium in the form of binary digits in domains of opposite magnetization. As clearly described in the cited application and meant herein, a domain is a region of a magnetic medium in which the magnetization vectors are substantially aligned. A domain is separated from another domain of substantially opposite direction of magnetization by an interdomain wall in which the magnetization vectors are substantially normal to those in the domains. When the magnetization vectors of the interdomain walls are in the plane of the medium, the interdomain walls are termed Néel walls; when normal to the plane of the medium, they are termed Block walls.

The invention described in the co-pending application requires the use of a separate magnetic scanning medium to read data in and out of the magnetic storage medium. In addition, storage time is limited by the velocity of propagation of an interdomain wall in the scanning medium. The invention which forms the subject matter of this application retains the high density data storage achieved in the aforementioned pending application, and eliminates the need of a separate scanning medium by use of time-varying non-uniform magnetic fields to store data in the magnetic storage medium and to retrieve data from the medium. In addition, the storage time of the present invention may be made to be extremely short, being determined only by the time required to reverse the direction of magnetization of a domain (commonly of the order of $10^{-9}$ seconds) and not by the velocity of propagation of an interdomain wall.

Accordingly it is a primary object of this invention to provide new and improved data processing techniques.

It is another object of this invention to provide techniques for processing data wherein suitable magnetic fields are utilized to divide a data storage medium into a sequence of oppositely oriented magnetic domains.

It is a further object of this invention to obtain a data processing device having a minimal storage time.

In the present invention a magnetic field is applied to a magnetic storage medium in a read-in operation; this applied field generates a sequence of oppositely oriented magnetic domains in the storage medium. The width of each domain may be controlled either by modulating the peak magnitude of the applied field or by applying a second field to inhibit the effect of the applied field. In the read-out operation, a third magnetic field is applied to the storage medium to reverse the direction of magnetization of any domains oppositely oriented to such field. The magnetization reversals in turn cause a change in magnetic flux coupled to a sensing coil to produce an output signal.

These and other novel features of the invention will become more apparent from the following detailed specification with reference to the accompanying drawings, in which.

Figures 7, 8, 9, 10:
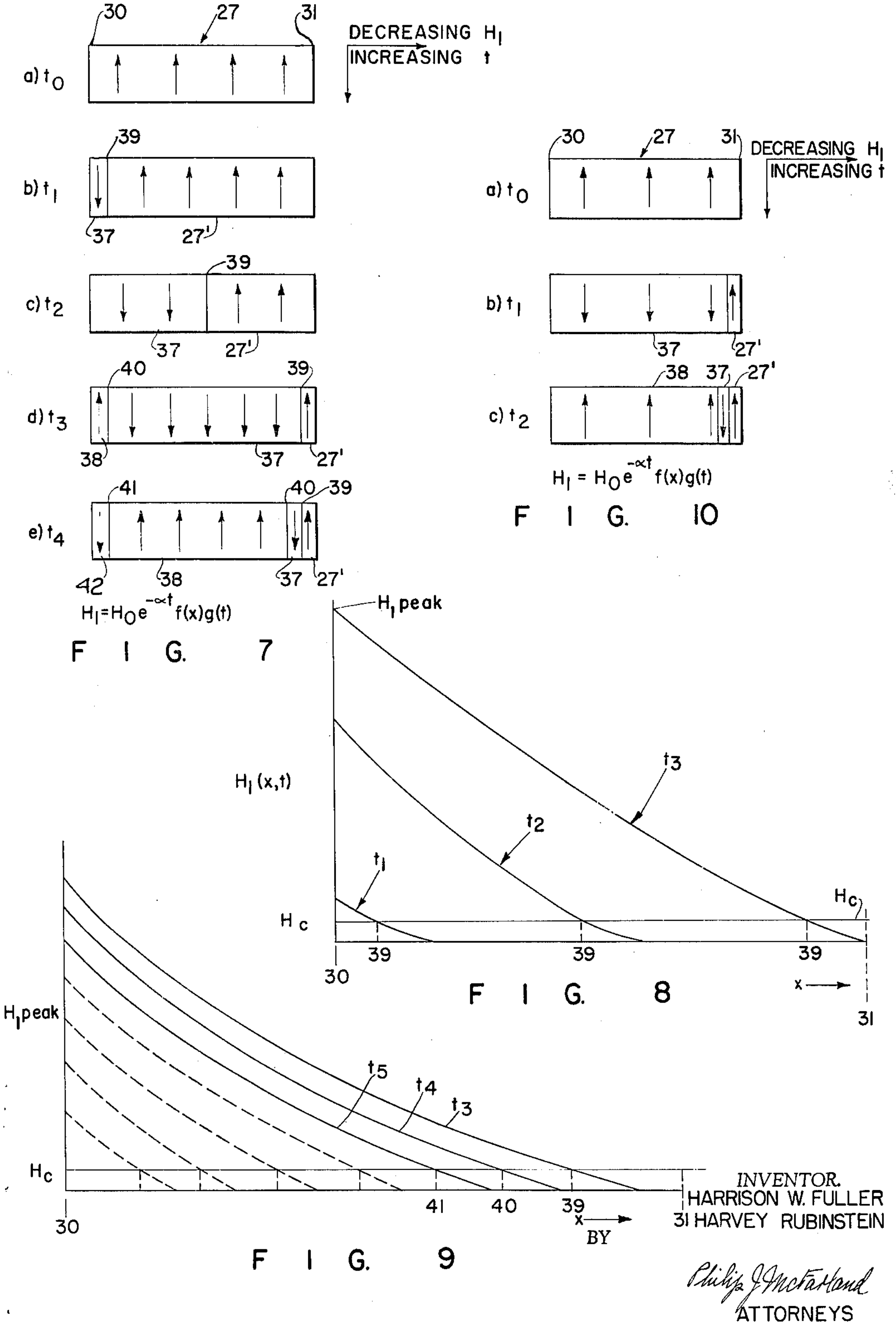

FIG. 7(*a*) through (*e*) illustrate one mode of formation of oppositely oriented domains;

FIG. 8 illustrates graphically the propagation of an interdomain wall in a magnetic storage medium on the application of a suitable magnetic field.

FIG. 9 illustrates graphically the final configuration of a series of interdomain walls in a magnetic storage medium generated by a suitable magnetic field.

FIGS. 10(*a*) through (*c*) illustrate a second mode of formation of oppositely oriented domains.

It is to be understood in the detailed description which follows that all fields are magnetic fields, all currents are electrical currents, all storage media are magnetic storage media, and all insulating or conducting media are electrically insulating or conducting.

Figure 1:
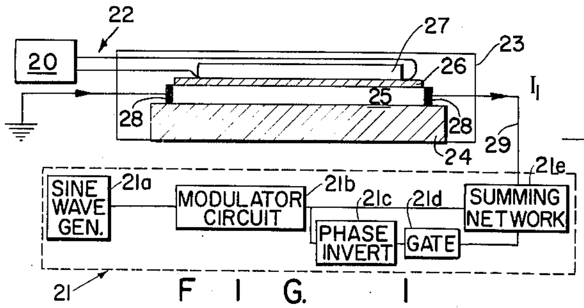
FIG. 1 illustrates a cross-sectional view of a preferred embodiment of the invention.

With reference now to the drawings and in particular to FIG. 1, a non-magnetic conducting medium 25 is deposited on an insulating substrate 24; an insulating medium 26 is deposited on medium 25 and a magnetic storage medium 27 is deposited on medium 26. This magnetic storage medium may be composed of a ferromagnetic material, typically Fe, Ni, Co, or alloys thereof. A current $I_1$, generated by a current source 21, flows through lead 29, terminals 28, and the conducting medium 25. Since the particular form of current source 21 is not critical to the invention and since it is possible to produce the current waveforms required to obtain the desired magnetic fields using known techniques and components, only the general organization of a current source is here required for an understanding of the invention. Thus, current source 21, in the read-in operation, may consist of a sine wave generator **21*a*, a modulating circuit 21*b* to damp the output of sine wave generator 21*a*, a phase inverter 21*c*, a gate generator 21*d*, and finally a summing circuit 21*e*. A coil 22 encircling the storage medium 27 connects to a sensing device 20. As in the case of the current source 21, the particular form of the sensing device 20 is not critical to the invention. For example, a data readout system as described in U.S. Patent #2,976,517 may be used. The apparatus is completed by enclosing all the elements except the current source 21 and the sensing device 20 in a box 23** to provide protection and shielding from stray magnetic and electric fields.

Figure 2:
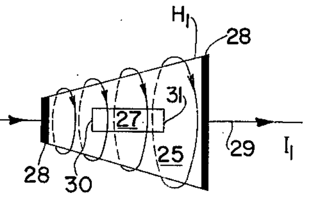
FIG. 2 illustrates means for applying a spatially decreasing magnetic field in the structure shown in FIG. 1 together with a magnetic storage medium.

In FIG. 2 the non-magnetic conducting medium 25 is shown to be increasing in width from left hand terminal 28 to right hand terminal 28. Current $I_1$ passing through leads 29 and terminals 28 gives rise to a magnetic field $H_1$ decreasing in intensity from edge 30 to edge 31 of the storage medium 27.

Figure 3:
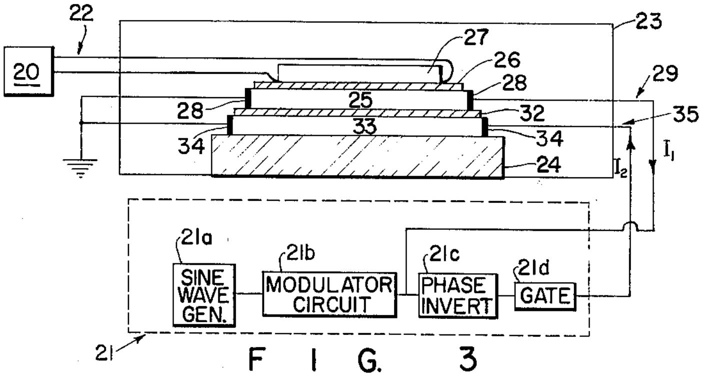
FIG. 3 illustrates a cross-sectional view of a second embodiment of the invention.

A second embodiment of the invention is shown in FIG. 3, appropriate reference numerals from FIG. 1 being retained. The structure is similar to that of FIG. 1 with the major changes being the addition of: a conducting non-magnetic medium 33 and an insulating medium 32 along with leads 35 and terminals 34. The current source 21 now generates current $I_1$ and current $I_2$. Thus, during the read-in operation, the magnetic field $H_2$ generated by current $I_2$ opposes the magnetic field generated by the current $I_1$.

Figure 4:
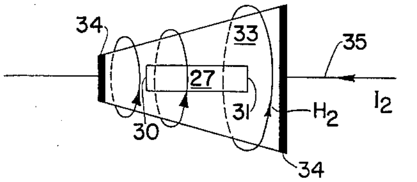
FIG. 4 illustrates means for applying an inhibiting magnetic field in the structure shown in FIG. 3, together with a magnetic storage medium.

The conducting non-magnetic medium 33 shown also in FIG. 4 is substantially the same as medium 25 in FIG. 2. However the sense of the current $I_2$ in medium 33 is opposite to current $I_1$ in medium 25 and gives rise to a field $H_2$ spatially decreasing from edge 30 to edge 31 but of opposite sense to field $H_1$.

A particular mode of operation of the device may be more easily explained with reference to FIGS. 5–9.

The applied field $H_1$ is of the form $$H_1 = H_0 h(t) f(x) g(t)$$

The function $h(t)$ is chosen to provide a damping factor on the magnitude of the field $H_1$. The function $g(t)$ gives the polarity of the field $H_1$ an oscillatory nature with the polarity changing in direction each half-cycle. The function $f(x)$ provides the spatially decreasing characteristic of the field $H_1$.

Figure 5:
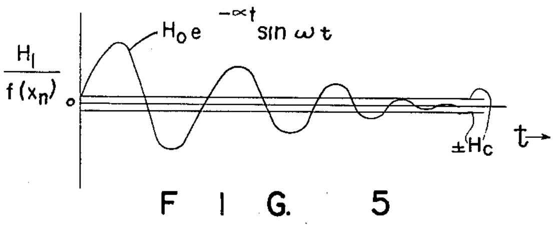
FIG. 5 is a representation of the intensity of a writing magnetic field as a function of time at any specified point in the storage medium.

In FIG. 5 the intensity of the field $H_1$ is shown as a function of time at any position $x_n$ in the storage medium 27. The intensity of the field $H_1$ is seen to be of an oscillatory nature in polarity where $g(t)$, in one mode of operation, is sinusoidal; the peak intensity of $H_1$ is slowly damped in time and follows an exponentially decreasing course $e^{-\alpha t}$.

Figure 6:
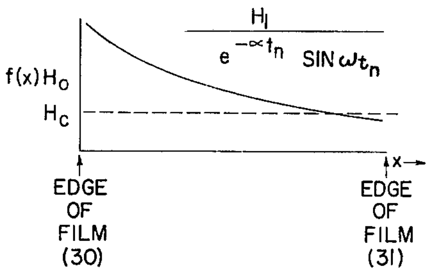
FIG. 6 is a representation of the intensity of all the magnetic fields as a function of distance along the storage medium at any specified time.

In FIG. 6, the intensity of the field $H_1$ is shown as a function of distance along the storage medium 27 at any instant in time. In the embodiments in FIGS. 1 and 3, this decrease is caused by the shape of the conductor 25. It is clearly seen that field $H_2$ will be of the same form spatially as field $H_1$.

In FIG. 7(*a*), the storage medium 27 is shown with its easy direction of magnetization aligned parallel to edges 30 and 31. If the field $H_1$ is applied with its initial polarity opposite in direction to the magnetization direction of the storage medium 27, the direction of magnetization of the storage medium 27 will begin to reverse where the field $H_1$ is the strongest, i.e. at edge 30. In FIG. 7(*b*) a domain 37 has been formed of opposite polarity to domain 27', i.e. the remainder of the storage medium 27. If the field $H_1$ is increased in magnitude during the initial portion of the first half-cycle, as shown in FIG. 5, the interdomain wall 39 will propagate down the storage medium, as shown in FIG. 7(*c*), until the peak intensity of the field $H_1$ during its first half-cycle is less than the value required to reverse the direction of magnetization of the storage medium 27. This value of the field is known as the coercive field, $H_c$, shown in FIG. 6; this value will be reached before the edge of the storage medium so as to prevent the domain 27' from being completely reversed. In FIG. 7(*d*) the interdomain wall 39 has stopped near edge 31; the polarity of $H_1$ has been reversed and a new domain 38 has been formed at edge 30. Since the peak value of field $H_1$ is reduced in time due to the damping function, the field strength propagating the interdomain wall 40 is insufficient to completely reverse the previously formed domain 37. The resulting domain configuration at the beginning of the third half-cycle is shown in FIG. 7(*c*). It is seen then that the spatially decreasing characteristic of the field is necessary to ensure the formation of interdomain walls at edge 30, the time increasing characteristic during the initial portion of each half-cycle is necessary to propagate such interdomain walls, and the damped characteristic of the field is necessary to prevent reversal of previously formed domains.

A second mode of domain formation is shown in FIGS. 10(*a*), (*b*), (*c*). Here the oscillating field $H_1$ does not gradually increase during the initial portion of each cycle as before, but rather is a square wave or a sequence of bipolar pulses. Since the field $H_1$ reaches peak value nearly instantaneously, the whole domain 37 may reverse direction simultaneously as in FIG. 10(*b*), the time for reversal being on the order of $10^{-9}$ sec. Because of the decreased peak value of the field $H_1$ the next domain 38 does not completely reverse domain 37, as shown in FIG. 10(*c*) for the same reasons as given before. Obviously, then, since the velocity of propagation of an interdomain wall is approximately $10^4$ cm./sec., the second mode of formation permits a faster storage time.

In the embodiment of FIG. 1, the domains may be made of varying widths by suitably modulating the current $I_1$ and hence the field $H_1$. This could be done, for example, by frequency modulating the current $I_1$, keeping the damping factor constant. The same result may also be obtained by lowering the peak magnitude of the current $I_1$ so that the field $H_1$ remains below $H_c$ during any half-cycle.

In the embodiment of FIG. 3, the domains may be made of varying widths by applying, simultaneously with field $H_1$, the current $I_2$ to produce the inhibiting field $H_2$, thereby reducing the resultant applied field to a value below $H_c$.

In the foregoing manner, information may be stored in the magnetic storage medium 27 in the form of a sequence of oppositely oriented domains of varying widths. During the readout operation, conducting medium 25 is energized by any known means (not shown) so as to create a field $H_3$ temporally increasing in magnitude at all points of the storage medium 27. It should be noted that field $H_3$ has the same spatial characteristic as field $H_1$. Because of the spatially decreasing nature of the field $H_3$, an interdomain wall will be formed at edge 30, again as shown in FIG. 7(*b*), and will be propagated to edge 31; this propagated interdomain wall will cause the domains antiparallel to the field $H_3$ to sequentially reverse their direction of magnetization and thereby cause sudden changes in magnetic flux through the coil 22. The changes in flux representative of the data stored in the magnetic storage medium 27 can be sensed by reading device 20. From the foregoing it becomes obvious that readout may be accomplished just as quickly as recording according to the first mode of operation described hereinbefore. Although this mode of read-out is destructive the data obtained may be stored and subsequently read back into the storage medium.

In the apparatus illustrated in FIGS. 2 and 4, the generation of a spatially decreasing field was accomplished by use of tapered conductors. In lieu of a tapered conductor, the thickness of the storage medium could be tapered, with the thickness decreasing from edge 30 to edge 31. It will then be observed that, since $H_c$ increases as the thickness of a magnetic medium decreases, an interdomain wall will form in the thickest part of the storage medium and propagate toward progressively thinner regions when a current is applied to the conductor. Still another way to create the effect of a spatially decreasing field is to build impurities into the storage medium in any known manner so that $H_c$ increases in magnitude from edge 30 to edge 31.

It should also be noted that it is not absolutely necessary for the storage medium to have any easy direction of magnetization.

The techniques illustrated and described above thus permit a high storage density with minimal storage and access time. In addition the need of a separate magnetic scanning medium to read-in data is eliminated and the speed at which data may be stored is not limited by interdomain wall velocity. Furthermore, a separate magnetic scanning medium is not needed to read data out of a storage medium.

Having thus described the invention it will be apparent that numerous modifications and departures may now be made by those skilled in the art, all of which fall within the scope contemplated by the invention. Consequently the invention herein described is to be construed to be limited only by the spirit and scope of the appended claims.

What is claimed is:

1. Data processing apparatus comprising: a magnetic storage medium in which data is stored as a sequence of oppositely oriented magnetic domains of varying widths; writing means including means for producing a first magnetic field acting on said storage medium to produce said sequence of domains, said first magnetic field having the characteristics of being oscillating, damped, and spatially decreasing, and means for varying the width of individual ones of said sequence of domains responsive to the data being stored; and, means for reading said stored data out of said storage medium.

2. Data processing apparatus in which data first is stored in a magnetic storage medium as a sequence of oppositely oriented magnetic domains of variable width and then is converted to an analogous electrical signal, comprising: a magnetic storage medium; writing means including means for producing a damped, periodic, and spatially decreasing magnetic field to create said sequence of domains and means for varying the width of said domains in accordance with the data being stored; and means responsive to the orientation and width of the magnetic domains in said sequence for producing an electric signal representative of the orientation and width of the magnetic domains in said sequence.

3. The apparatus of claim 2 wherein said magnetic storage medium has an easy direction of magnetization.

4. The apparatus of claim 3 wherein said storage medium is a magnetic thin film, the magnetization vectors of said magnetic thin film being prealigned along the easy direction of magnetization, and the direction of the magnetic field being substantially parallel to said easy direction of magnetization.

5. The apparatus of claim 2 wherein the means for varying the width of said domains comprises means for intermittently applying a second magnetic field to said storage medium together with said first magnetic field, said secong magnetic field being adapted to control the effect of said first magnetic field on said storage medium.

6. The apparatus of claim 2 wherein the means for varying the width of said domains includes means for intermittently modulating the magnitude of said first magnetic field to control the effect of said first magnetic field on said storage medium.

7. The apparatus of claim 2 wherein said readout means comprises means for producing an independent magnetic field, said independent magnetic field having the same spatially decreasing characteristic as said magnetic field of said writing means and being temporally increasing sequentially to reverse the direction of magnetization of domains oppositely oriented to said independent magnetic field; a coil coupled the magnetic field of said domains to produce an electrical signal representative of the magnetization reversals of said domains and said independent magnetic field; and means responsive to said electrical signal to produce an output representative only of the magnetization reversals of said domains.

8. In a data processing apparatus in which data is stored in a magnetic storage medium in the form of oppositely oriented domains of varying widths, writing means including means for producing a first magnetic field acting on said storage medium to produce said sequence of domains, said first magnetic field having the characteristics of being damped, oscillating, and spatially decreasing, and means responsive to the data being stored for varying the width of individual ones of said domains.

9. The apparatus of claim 8 wherein the means for varying the width of said domains including means for producing a second magnetic field intermittently acting together with said first magnetic field, said second field being adapted to control the effect of said first field.

10. The apparatus of claim 8 wherein the means for varying the width of said domains comprises means for intermittently modulating the magnitude of said first magnetic field to control the effect of said first magnetic field on said storage medium.

References Cited by the Examiner

UNITED STATES PATENTS

| | | | |
|---|---|---|---|
| 2,919,432 | 12/59 | Broadbent | 340—174 |
| 2,984,825 | 5/61 | Fuller et al. | 340—174 |
| 2,990,540 | 7/61 | Sublette et al. | 340—174 |

IRVING L. SRAGOW, *Primary Examiner.*